United States Patent
Luan et al.

(10) Patent No.: US 11,931,967 B2
(45) Date of Patent: Mar. 19, 2024

(54) MATERIAL PHASE DETECTION IN ADDITIVE MANUFACTURING

(71) Applicant: Hewlett-Packard Development Company, L.P., Spring, TX (US)

(72) Inventors: He Luan, Palo Alto, CA (US); Jun Zeng, Palo Alto, CA (US)

(73) Assignee: Hewlett-Packard Development Company, L.P., Spring, TX (US)

(*) Notice: Subject to any disclaimer, the term of this patent is extended or adjusted under 35 U.S.C. 154(b) by 79 days.

(21) Appl. No.: 17/311,840

(22) PCT Filed: Apr. 10, 2019

(86) PCT No.: PCT/US2019/026742
§ 371 (c)(1),
(2) Date: Jun. 8, 2021

(87) PCT Pub. No.: WO2020/209849
PCT Pub. Date: Oct. 15, 2020

(65) Prior Publication Data
US 2022/0016847 A1    Jan. 20, 2022

(51) Int. Cl.
| | |
|---|---|
| *B33Y 50/02* | (2015.01) |
| *B29C 64/209* | (2017.01) |
| *B29C 64/393* | (2017.01) |
| *B33Y 30/00* | (2015.01) |
| *G06N 20/10* | (2019.01) |

(Continued)

(52) U.S. Cl.
CPC .......... *B29C 64/393* (2017.08); *B29C 64/209* (2017.08); *B33Y 30/00* (2014.12); *B33Y 50/02* (2014.12); *G06N 20/10* (2019.01); *G06N 3/048* (2023.01); *G06N 3/08* (2013.01)

(58) Field of Classification Search
CPC ..... B29C 64/393; B29C 64/209; B33Y 30/00; B33Y 30/02; G06N 20/10; G06N 3/048; G06N 3/08
See application file for complete search history.

(56) References Cited

U.S. PATENT DOCUMENTS

| | | |
|---|---|---|
| 7,690,838 B2 | 4/2010 | Sumi |
| 8,073,315 B2 | 12/2011 | Philippi |

(Continued)

FOREIGN PATENT DOCUMENTS

| | | | | |
|---|---|---|---|---|
| CN | 109070448 A | 12/2018 | | |
| CN | 106455862 B | * 5/2020 | ........... | A01N 1/0252 |

(Continued)

OTHER PUBLICATIONS

Schryver et al. "System, Device And Method For Automatic Sample Thawing", DOC CN-106455862 (translation), 2020, p. 40.*

(Continued)

*Primary Examiner* — Li Wu Chang
(74) *Attorney, Agent, or Firm* — Shook, Hardy & Bacon L.L.P.

(57) ABSTRACT

Examples of methods for detecting a material phase are described herein. In some examples, a kernel is predicted based on an input corresponding to an object and based on a machine learning model. In some examples, the machine learning model is constrained with a physical model. In some examples, a material phase is detected based on the kernel.

15 Claims, 6 Drawing Sheets

(51) Int. Cl.
*G06N 3/048* (2023.01)
*G06N 3/08* (2023.01)

(56) References Cited

U.S. PATENT DOCUMENTS

| | | | |
|---|---|---|---|
| 9,713,856 | B2 | 7/2017 | Fockele |
| 10,011,071 | B2 | 7/2018 | Batchelder |
| 10,207,489 | B2 | 2/2019 | Dave et al. |
| 2013/0024415 | A1 | 1/2013 | Herzog |
| 2016/0043453 | A1* | 2/2016 | Ebner ............... H01M 50/213 429/120 |
| 2016/0136982 | A1 | 5/2016 | Heath |
| 2017/0297109 | A1 | 10/2017 | Gibson et al. |
| 2017/0334144 | A1 | 11/2017 | Fish et al. |
| 2018/0017956 | A1 | 1/2018 | Garcia Reyero Vinas et al. |
| 2019/0126606 | A1 | 5/2019 | Fornos et al. |
| 2019/0250098 | A1* | 8/2019 | Inan ..................... G01N 21/255 |
| 2020/0257933 | A1* | 8/2020 | Steingrimsson ........ B22F 12/45 |

FOREIGN PATENT DOCUMENTS

| | | | |
|---|---|---|---|
| EP | 3837106 A1 | 6/2021 | |
| WO | WO-2017196345 A1 | 11/2017 | |
| WO | WO-2018140034 A1 | 8/2018 | |
| WO | WO-2018182596 A1 | 10/2018 | |
| WO | 2020/091724 A1 | 5/2020 | |

OTHER PUBLICATIONS

Sinchuk et al. "Computed-tomography based modeling and simulation of moisture diffusion and induced swelling in textile composite materials", IJSS, 2018, pp. 88-96.*

Hiller et al. "Design and analysis of digital materials for physical 3D voxel printing", RPJ, 2009, pp. 137-149.*

Hodge, N. E., et al., "Implementation of a thermomechanical model for the simulation of selective laser melting", Computational Mechanics, vol. 54, No. 1, Apr. 23, 2014, pp. 33-51.

Meier, C., et al., "Physics-Based Modeling and Predictive Simulation of Powder Bed Fusion Additive Manufacturing Across Length Scales", arxiv.org, Cornell University Library, 201 Olin Library Cornell University Ithaca, NY 14853, Jul. 29, 2021, pp. 1-28.

Viana F. A. C., et al., "A Survey of Bayesian Calibration and Physics-informed Neural Networks in Scientific Modeling", Archives of Computational Methods in Engineering, Springer Netherlands, Dordrecht, vol. 28, No. 5, Feb. 5, 2021, pp. 3801-3830.

Hooke's law, Wikipedia, 17 pages, Available at: https://en.wikipedia.org/wiki/Hooke%27s_law (accessed Mar. 13, 2019).

* cited by examiner

MATERIAL PHASE DETECTION IN ADDITIVE MANUFACTURING

BACKGROUND

Three-dimensional (3D) solid parts may be produced from a digital model using additive manufacturing. Additive manufacturing may be used in rapid prototyping, mold generation, mold master generation, and short-run manufacturing. Additive manufacturing involves the application of successive layers of build material. This is unlike traditional machining processes that often remove material to create the final part. In some additive manufacturing techniques, the build material may be cured or fused.

DETAILED DESCRIPTION

Figure 1:
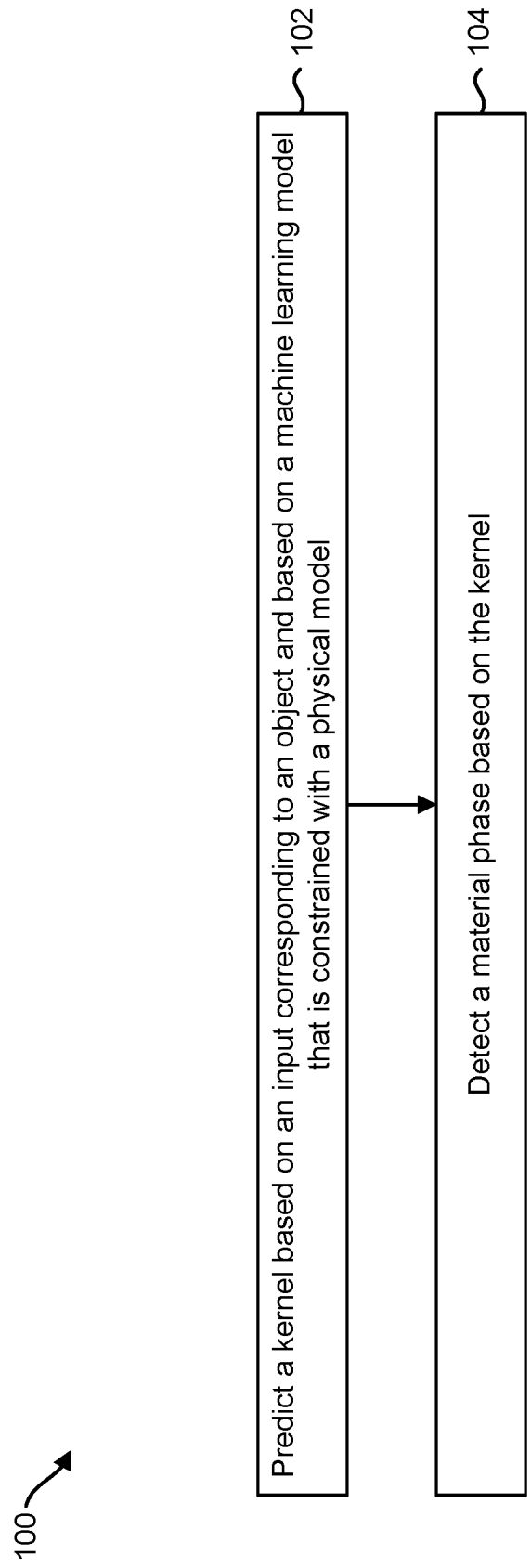
FIG. 1 is a flow diagram illustrating an example of a method for material phase detection.

Additive manufacturing may be used to manufacture 3D objects. Three-dimensional (3D) printing is an example of additive manufacturing. Some examples of 3D printing may selectively deposit agents (e.g., droplets) at a pixel level to enable control over voxel-level energy deposition. For instance, thermal energy may be projected over material in a build area, where a phase change and solidification in the material may occur depending on the voxels where the agents are deposited.

In some approaches, a phase condition of a voxel of material may be inferred from a sensed voxel temperature. However, voxels at the same temperature can have different degrees of phase conditions. Accordingly, inferring phase conditions from sensed voxel temperature may not accurately reflect the actual phase conditions. Material phase may be classified into phase conditions (e.g., solid, liquid, powder, solidified part, phase in between, or phase change, etc.).

In some examples, a kernel may be utilized to detect a material phase. A kernel is a model that indicates a property of material. In some configurations, a kernel may be determined (e.g., predicted) based on a machine learning model that is constrained with a physical model. A physical model is a model of a physical phenomenon. A physical model may be deterministic. An example of a physical model is a heat transfer model.

An example of a phase condition is a sintering condition. A sintering condition is a phase condition in which particles join together (into a mass, for example). Some examples of the techniques described herein include methods to detect, in-situ, a particle sintering condition at the voxel level. In some approaches, voxel temperature information may be augmented with thermal diffusivity, which is an indicator (e.g., a better indicator than mere temperature) of the sintering condition. Thermal diffusivity is the ability of a material to transfer (e.g., absorb or disperse) heat. For example, thermal diffusivity of a voxel of material may be the ability of the voxel to absorb heat from or disperse heat to a neighboring voxel or voxels. In some examples, thermal diffusivity may be a function of the properties of a voxel and also a function of the properties of neighboring voxels. Properties of thermal diffusivity may include phase and temperature. For example, thermal diffusivity may vary based on the current phase of a material (e.g., solid, liquid, powder, solidified object, or phase in between, etc.) and current temperature of the material. A complicating factor for learning thermal diffusivity is that thermal diffusivity may be anisotropic. For example, the impact of different neighboring voxels may not be the same. Another complicating factor is material heterogeneity, where different materials exhibit different thermal diffusivity properties.

In some examples, a machine learning model may be utilized to extract an adaptive thermal diffusivity kernel from in-situ thermal sensing. The adaptive thermal diffusivity kernel may be utilized to detect the in-situ particle sintering condition.

In some examples, material phase detection may be utilized in determining and/or improving the geometrical accuracy of an object being manufactured (e.g., printed). For example, material phase detection may be utilized to detect, in-situ, the boundary voxels of an object. In some examples, a risk assessment of the probability of particle sintering events may be provided for powder voxels surrounding an object based on sensing information. Material phase detection may allow determining, while printing, the geometrical accuracy of the object.

Material phase detection (and/or geometrical accuracy determination) may be utilized to perform an operation or operations. For example, material phase detection may be utilized in active closed-loop control, where thermal applications of a future layer may be modified to alleviate a condition that causes sintering errors. A sintering error is the occurrence of sintering in a non-target location (e.g., in a powder voxel outside of an object) or is the lack of sintering in a target location (e.g., in a voxel that is part of an object). Material phase detection may be utilized in a monitoring procedure. For example, a frequency of sintering errors may trigger a pause or stop in production. Material phase detection may be utilized in a monitoring procedure, where sintering errors (e.g., voxels with sintering errors and/or an object associated with sintering errors) may be flagged. For example, an object may be flagged for additional post-print metrology measurement, part quality measurement, and/or control evaluation.

Material phase (e.g., phase change) and/or phase conditions may include a sintering condition, polymer crystallinity, elasticity (e.g., strength), etc. While a sintering condition (which may indicate a status of particle phase with an energy input) is given as an example of material phase herein, the techniques described herein may be utilized to detect other phase conditions at the voxel level.

For a given layer, thermal diffusion (from all pixels) may be one energy driver for a pixel. Other energy drivers may include energy absorption (for a part voxel) and convective air loss (for all voxels). Thermal diffusion is one energy driver for buried layers. Thermal diffusion (heat flux) may occur while there is temperature gradient for neighboring voxels within a part, part/powder boundary, and/or within powder.

Some examples of the techniques described herein may leverage machine learning (e.g., deep learning) to address the aforementioned difficulties. For example, a machine learning model (e.g., quantitative model) may be trained and discovered via deep learning to generate an adaptive thermal diffusivity kernel. An adaptive thermal diffusivity kernel is an output of a machine learning model (e.g., neural network) of thermal diffusivity for a voxel or voxels of a material or materials. The adaptive thermal diffusivity kernel is adaptive in the sense that the thermal diffusivity kernel adapts to material phase (e.g., material phase of a voxel and/or a neighboring voxel or voxels). For example, the adaptive thermal diffusivity kernel is adaptive to neighboring voxel properties or the adaptive thermal diffusivity kernel may adapt to address the phase of a voxel and its neighboring voxels. The machine learning model, once learned, may be applied online in near-real-time to determine thermal diffusivity at a local position (e.g., pixel, voxel) according to the actual local environment.

Some examples of the techniques disclosed herein include a physical model constrained machine learning model (e.g., data-driven quantitative model) that may learn voxel thermal diffusivity as a function of neighboring voxel phase and environment. For example, given a temperature map at time t and/or a shape map, the machine learning model may adaptively predict thermal diffusivity in different directions at any local position (e.g., voxel), and may predict a temperature map at time t+dt (where dt is a time interval after t for prediction).

Some examples of the techniques disclosed herein may utilize a hybrid modeling approach that combines a physical model and a deep learning model to learn a physical property. For instance, a physical model-constrained data-driven approach may be utilized that models the property of each pixel or voxel as a kernel (e.g., an adaptive thermal diffusivity kernel). In some examples, a neural network architecture may be utilized that predicts a phase condition (e.g., sintering condition, crystallinity, elasticity, etc.).

In some examples, thermal behavior may be mapped as a temperature map. A temperature map is a set of data indicating temperature(s) (or thermal energy) in an area or volume. Temperature mapping may include obtaining (e.g., sensing and/or capturing) a temperature map or thermal images and/or calculating (e.g., predicting) a temperature map or thermal images.

A temperature map may be based on a captured thermal image. A captured thermal image is sensed or captured with a sensor or sensors. In some examples, a thermal image may be captured along a dimension (e.g., x, y, or z direction), in two dimensions (2D) (e.g., x and y, x and z, or y and z), or three dimensions (3D) (e.g., x, y, and z). The temperature map may be the thermal image or may be based on the thermal image. For example, a transformation may be applied to the captured thermal image to produce the temperature map.

It should be noted that while plastics (e.g., polymers) may be utilized as a way to illustrate some of the approaches described herein, the techniques described herein may be utilized in various examples of additive manufacturing. For instance, some examples may be utilized for plastics, polymers, semi-crystalline materials, metals, etc. Some additive manufacturing techniques may be powder-based and driven by powder fusion. Some examples of the approaches described herein may be applied to area-based powder bed fusion-based additive manufacturing, such as Stereolithography (SLA), Multi-Jet Fusion (MJF), Metal Jet Fusion, Selective Laser Melting (SLM), Selective Laser Sintering (SLS), liquid resin-based printing, etc. Some examples of the approaches described herein may be applied to additive manufacturing where agents carried by droplets are utilized for voxel-level thermal modulation. It should be noted that agents may or may not be utilized in some examples. It should also be noted that while some resolutions are described herein as examples, the techniques described herein may be applied for different resolutions.

As used herein, the term "voxel" and variations thereof may refer to a "thermal voxel." In some examples, the size of a thermal voxel may be defined as a minimum that is thermally meaningful (e.g., larger than 42 microns or 600 dots per inch (dpi)). An example of voxel size is 25.4 millimeters (mm)/150≈170 microns for 150 dots per inch (dpi). A maximum voxel size may be approximately 490 microns or 50 dpi. The term "voxel level" and variations thereof may refer to a resolution, scale, or density corresponding to voxel size.

A voxel that is filled with powder (e.g., a "powder voxel") may include particles insulated with air pockets. A powder voxel's ability to transmit heat is limited, relying on limited touching surfaces among particles. An "object voxel," where particles are well sintered or even fully melted is filled primarily with the material itself with no air bubbles or small air bubbles. An object voxel's ability to transmit heat may be close to that of the bulk material itself. A thermal diffusivity differential for polymer may be about two or more. For metal particles, the thermal diffusivity differential may be an order of magnitude higher.

Throughout the drawings, identical or similar reference numbers may designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

FIG. 1 is a flow diagram illustrating an example of a method 100 for material phase detection. The method 100 and/or an element or elements of the method 100 may be performed by an apparatus (e.g., electronic device). For example, the method 100 may be performed by the 3D printing device 300 described in connection with FIG. 3 and/or the apparatus 432 described in connection with FIG. 4.

The apparatus may predict 102 a kernel based on an input corresponding to an object and a machine learning model that is constrained with a physical model. In some examples, a kernel may be predicted 102 for each of a set of pixels or voxels (e.g., for each pixel or voxel in a temperature map, a shape map, and/or a contone map). In some examples, the kernel may be predicted corresponding to a time interval dt.

The input is a set of data related to object manufacture. The input corresponds to an object or objects (e.g., a layer of an object or objects) for manufacture or an object or objects (e.g., a layer of an object or objects) that are being manufactured. Examples of the input include a temperature map, a shape map, a contone map, combinations thereof, portions thereof, and/or combinations of portions thereof.

A shape map is a set (e.g., 2D grid) of values that indicates locations for manufacturing (e.g., printing) an object. For example, a shape map may indicate where an object should be formed in a layer. In some examples, a shape map may be a 2D layer (e.g., 2D slice, 2D cross-section, etc.) of a 3D model.

A contone map is a set of data indicating a location or locations (e.g., areas) for printing a substance (e.g., fusing agent or detailing agent). In some examples, a contone map may include or indicate machine instructions (e.g., voxel-level machine instructions) for printing a substance. For example, a fusing agent contone map indicates coordinates and/or an amount for printing the fusing agent. In an example, a detailing agent contone map indicates coordinates and/or an amount for printing the detailing agent. In some examples, a contone map may correspond to a shape map. For instance, a 3D model may be processed to produce a plurality of contone maps corresponding to a plurality of layers of the 3D model. In some examples, a contone map may be expressed as a 2D grid of values, where each value may indicate whether to print an agent and/or an amount of agent at the location on the 2D grid. For instance, the location of a value in the 2D grid may correspond to a location in a build area (e.g., a location (x, y) of a particular level (z) at or above the build area). In some examples, a contone map may be a compressed version of a 2D grid or array (e.g., a quadtree).

The machine learning model may be constrained based on a physical model. Examples of physical models include Hooke's law and a heat transfer model. The machine learning model may be constrained based on a physical model in that the machine learning model may be structured in accordance with the physical model.

In some examples, the apparatus may predict 102 the kernel by providing the input to the machine learning model. The machine learning model may produce the kernel using the input. Examples of the kernel (e.g., an adaptive thermal diffusivity kernel) and a machine learning model are given as follows.

An adaptive thermal diffusivity kernel is a model of thermal diffusivity for a voxel or voxels of a material or materials. An example of the adaptive thermal diffusivity kernel may be based on a heat transfer model, which may be expressed in accordance with Equation (1).

$$\frac{\partial T(x, y)}{\partial t} = k \Delta T(x, y, t) \tag{1}$$

In Equation (1), T is temperature, x is one coordinate (e.g., a coordinate in a dimension of a 2D coordinate system or a horizontal dimension), y is another coordinate (e.g., another coordinate corresponding to another dimension of the 2D coordinate system or a vertical dimension), k is thermal diffusivity, Δ denotes a Laplacian, and t is time. In a case of homogeneous material, k may be treated as a constant.

A discretization of the heat transfer model (e.g., Equation (1)) may be expressed as given in Equation (2).

$$\frac{T(x, y, t+dt) - T(x, y, t)}{dt} = \tag{2}$$

$$k \frac{1}{h^2} (T(x+h, y, t) + T(x-h, y, t) + T(x, y+h, t) +$$

$$T(x, y-h, t) - 4T(x, y, t)) = k \frac{1}{h^2} \begin{bmatrix} 0 & 1 & 0 \\ 1 & -4 & 1 \\ 0 & 1 & 0 \end{bmatrix}$$

$$\begin{bmatrix} T(x-h, y+h, t) & T(x, y+h, t) & T(x+h, y+h, t) \\ T(x-h, y, t) & T(x, y, t) & T(x+h, y, t) \\ T(x-h, y-h, t) & T(x, y-h, t) & T(x+h, y-h, t) \end{bmatrix}$$

In Equation (2), h is a dimension (e.g., width) of a pixel or voxel. In a case (e.g., real-world case) where k is anisotropic, Equation (2) may be expressed as Equation (3).

$$\frac{T(x, y, t+dt) - T(x, y, t)}{dt} = \frac{1}{h^2} \begin{bmatrix} 0 & k_{01} & 0 \\ k_{10} & -4k_{11} & k_{12} \\ 0 & k_{21} & 0 \end{bmatrix} \tag{3}$$

$$\begin{bmatrix} T(x-h, y+h, t) & T(x, y+h, t) & T(x+h, y+h, t) \\ T(x-h, y, t) & T(x, y, t) & T(x+h, y, t) \\ T(x-h, y-h, t) & T(x, y-h, t) & T(x+h, y-h, t) \end{bmatrix}$$

If T is used to represent a temperature map, then Equation (3) may be expressed as Equation (4).

$$T(t+dt) = dt \cdot \frac{1}{h^2} \cdot K \circ A * T(t) + T(t) \tag{4}$$

In Equation (4), $$K = \begin{bmatrix} 0 & k_{01} & 0 \\ k_{10} & k_{11} & k_{12} \\ 0 & k_{21} & 0 \end{bmatrix}, A = \begin{bmatrix} 0 & 1 & 0 \\ 1 & -4 & 1 \\ 0 & 1 & 0 \end{bmatrix},$$

∘ is an element-wise product, and * is a convolution operation. Equation (4) is numerically solvable.

K is an example (e.g., a matrix form) of the adaptive thermal diffusion kernel, A is an example of a parameter matrix, and $k_{01}$, $k_{10}$, $k_{11}$, $k_{12}$, and $k_{21}$ are examples of kernel parameters. For example, $k_{01}$ is a kernel parameter corresponding to a pixel or voxel above the current pixel or voxel, $k_{10}$ is a kernel parameter corresponding to a pixel or voxel to the left of the current pixel or voxel, $k_{11}$ is a kernel parameter corresponding to the current pixel or voxel, $k_{12}$ is a kernel parameter corresponding to a pixel or voxel to the right of the current pixel or voxel, and $k_{21}$ is a kernel parameter corresponding to a pixel or voxel below the current pixel or voxel. Kernel parameters are thermal diffusion values in an adaptive thermal diffusivity kernel. In this example, $k_{01}$, $k_{10}$, $k_{12}$, and $k_{21}$ are neighboring kernel parameters to the kernel parameter $k_{11}$ (e.g., central kernel parameter). Neighboring kernel parameters are kernel parameters that are peripheral to (e.g., next to or at a distance from) a central kernel parameter or central kernel parameters.

For heterogeneous material, the adaptive thermal diffusion kernel (e.g., K) is phase-dependent and temperature-dependent. For example, at each pixel or voxel, the kernel parameters (e.g., $k_{01}$, $k_{10}$, $k_{11}$, $k_{12}$, and $k_{21}$) in the adaptive thermal diffusivity kernel (e.g., K) may be a function of neighboring phase and temperature. A machine learning model (e.g., neural network) may be utilized to predict the function. An example of the machine learning model (e.g., neural network architecture) is described in connection with FIG. 5. The machine learning model may be trained to learn weights.

The adaptive thermal diffusivity kernel may be predicted 102 based on a temperature map. For example, the apparatus may obtain (e.g., sense, receive, request and receive) the temperature map from a sensor or sensors. For example, a sensor may capture a thermal image of a print bed to produce the temperature map. The temperature map or a portion (e.g., patch) of the temperature map may be utilized as the input to predict 102 the adaptive thermal diffusivity kernel. For example, the weights may be utilized to determine the adaptive thermal diffusivity kernel based on the temperature map.

In some examples, the input to the machine learning model may be denoted X. In some examples, the input may be the temperature map or a portion of the temperature map at a time (e.g., T(t), where t is a current time or timestamp). In some approaches, the temperature map or portion of a temperature map T(t) (e.g., input sensed temperature) may represent phase and/or temperature. In some examples, the input may be a concatenation of a temperature map and a shape map or portions thereof. For instance, the input X may be a portion of T(t) concatenated with a portion of shape map S of a layer (e.g., a current layer of build material(s)). The shape map S may be utilized as input to add more fine details.

In some examples, the apparatus may utilize the machine learning model to predict 102 the adaptive thermal diffusivity kernel based on the input X. For example, the apparatus may apply the input X to the machine learning model (using the weights, for instance) to predict 102 the adaptive thermal diffusivity kernel. In some examples, predicting 102 the adaptive thermal diffusivity kernel includes convolving (e.g., separately convolving) a sub-kernel or sub-kernels with the input to produce the adaptive thermal diffusivity kernel. A sub-kernel is a set (e.g., matrix) of weights. A kernel parameter may be determined based on the convolution of the sub-kernel with the input. The adaptive thermal diffusivity kernel may be determined based on (e.g., may include) the kernel parameter(s). For example, the apparatus may arrange the kernel parameters into the adaptive thermal diffusivity kernel (e.g., into a matrix form of an adaptive thermal diffusivity kernel). For instance, the apparatus may arrange the kernel parameters into a matrix form for Equation (4). While some of the examples described herein illustrate a machine learning model (e.g., deep learning model, neural network, etc.) with one layer, a machine learning model with one layer or multiple layers may be implemented in accordance with the techniques described herein.

In some examples, predicting 102 the adaptive thermal diffusivity kernel is based on a machine learning model (e.g., deep learning model, neural network, etc.) with one layer or multiple layers. For example, predicting 102 the adaptive thermal diffusivity kernel may include using a neural network to determine the adaptive thermal diffusivity kernel K at pixel (x, y) from an input X. For example, the apparatus may concatenate an m×m patch (e.g., a pixel with neighboring pixels) of the temperature map T(t) with an m×m patch of the shape map S as input X. The input may be separately convolved with a number of m×m sub-kernels. In some examples, a sub-kernel may be denoted Q. In some examples, five different m×m sub-kernels $Q_{01}$, $Q_{10}$, $Q_{11}$, $Q_{12}$, and $Q_{21}$ may be separately convolved with the input. The five resulting values may be the kernel parameters $k_{01}$, $k_{10}$, $k_{11}$, $k_{12}$, and $k_{21}$.

In some examples, predicting the adaptive thermal diffusivity kernel is based on an activation function to ensure that a kernel parameter is greater than zero. An example of the activation function is the rectified linear unit function, which may be denoted $ReLu_{(\ )}$. For example, the $ReLu_{(\ )}$ activation function may be utilized to make sure that the kernel parameter is greater than zero, so that kernel parameter is consistent with physical meaning. In an example, the kernel parameters $k_{01}$, $k_{10}$, $k_{11}$, $k_{12}$, and $k_{21}$ may be determined in accordance with Equation (5).

$$k_{01} = ReLu(Q_{01} * X)$$

$$k_{10} = ReLu(Q_{10} * X)$$

$$k_{11} = ReLu(Q_{11} * X)$$

$$k_{u} = ReLu(Q_{12} * X)$$

$$k_{21} = ReLu(Q_{21} * X) \quad (5)$$

In Equation (5), $Q_{01}$, $Q_{10}$, $Q_{11}$, $Q_{12}$, and $Q_{21}$ are m×m sub-kernels. For example, m may be 3, 4, 5, 6, or another value. In some approaches, m may be experimentally tuned. In this example, the five kernel parameters $k_{01}$, $k_{10}$, $k_{11}$, $k_{12}$, and $k_{21}$ may be re-formulated as the adaptive thermal diffusivity kernel K.

The apparatus may detect 104 a material phase based on the kernel. In some examples, detecting 104 the material phase may include calculating a statistic metric of the kernel. A statistic metric is a statistical measure or value. The statistic metric may indicate a probability of a phase condition or a phase condition score. For example, the apparatus may calculate a norm (e.g., L1 norm, L2 norm, etc.) of the kernel. The statistic metric (e.g., norm) may indicate a probability of a phase condition or a phase condition score. For example, the apparatus may compare the statistic metric to a threshold. A phase condition (e.g., phase change, material undergoing a sintering phase change, etc.) may be detected in a case that the statistic metric satisfies the threshold.

In some examples, for each pixel or voxel located at (x, y), the apparatus may calculate the norm of a kernel $$K = \begin{bmatrix} 0 & k_{01} & 0 \\ k_{10} & k_{11} & k_{12} \\ 0 & k_{21} & 0 \end{bmatrix}$$

in accordance with Equation (6).

$$|K| = \sqrt{k_{01}^2 + k_{10}^2 + k_{11}^2 + k_{12}^2 + k_{21}^2} \quad (6)$$

In Equation (6), $k_{01}$, $k_{10}$, $k_{11}$, $k_{12}$, and $k_{21}$ are examples of kernel parameters from the kernel. In an example where K is a thermal diffusivity kernel, the norm |K| may indicate a probability of a sintering phase. For instance, |K| may indicate different degrees of a sintering condition: as |K| increases, the probability that boundary powder is undergoing sintering also increases. In some examples, the norm |K| may be referred to as an in-situ particle sintering phase score.

In some examples, the apparatus may utilize an input (e.g., temperature map T, shape map S, contone map C, etc.) and a machine learning model that is physically constrained to predict a kernel $$K = \begin{bmatrix} k_{00} & k_{01} & k_{02} \\ k_{10} & k_{11} & k_{12} \\ k_{20} & k_{21} & k_{22} \end{bmatrix}.$$

In the foregoing examples, the dimensions of the kernel K are 3×3. The kernel may have other (e.g., more or fewer)

dimensions. In some examples, for each pixel or voxel located at (x, y), the apparatus may calculate the norm of the kernel $$K = \begin{bmatrix} k_{00} & k_{01} & k_{02} \\ k_{10} & k_{11} & k_{12} \\ k_{20} & k_{21} & k_{22} \end{bmatrix}$$

in accordance with Equation (7).

$$|K| = \sqrt{k_{00}^2 + k_{01}^2 + k_{02}^2 + k_{10}^2 + k_{11}^2 + k_{12}^2 + k_{20}^2 + k_{21}^2 + k_{22}^2} \quad (7)$$

In Equation (7), $k_{00}$, $k_{01}$, $k_{02}$, $k_{10}$, $k_{11}$, $k_{12}$, $k_{20}$, $k_{21}$, and $k_{22}$ are examples of kernel parameters from the kernel. For instance, |K| may indicate different degrees of probability of a phase condition or conditions. In some examples, the norm |K| may be referred to as phase condition score.

In some examples, detecting 104 the material phase based on the kernel may include comparing the statistic metric (e.g., norm) to a threshold. For example, if |K|>threshold, then a phase condition may be detected. An example of the threshold is 0.8. Other values may be utilized for the threshold (e.g., 0.25, 0.5, 0.75, 0.775, 0.78, 0.79, 0.81, 1, etc.). For instance, if |K|>threshold, a phase condition (or phase condition change) may be detected at a location (x, y). In an example where K is an adaptive thermal diffusivity kernel, if |K|>threshold, the powder at a location (x, y) may be detected as undergoing sintering due to thermal diffusion from neighboring voxels. Accordingly, some examples of the techniques described herein may enable detecting an in-situ particle sintering condition at a voxel level (from a temperature map and/or shape map) based on adaptive thermal diffusivity detection.

In some examples, the machine learning model may be constrained with the physical heat transfer model. The machine learning model may learn the thermal diffusivity as an adaptive thermal diffusivity kernel K, where each kernel parameter is a function of the current pixel or voxel phase and/or temperature. For example, a neural network may be utilized to learn the function. The parameters in the neural network may be weights to be estimated during training.

In some examples, the machine learning model may be a neural network. For example, the machine learning model may utilize one convolution layer, which builds a linear model. In other examples, a hidden layer or hidden layers may be added to build non-linear models. An additional hidden layer or layers may enable learning higher order kernel parameters in the kernel K. For instance, a second-order discretization of a physical model (e.g., Equation (1) or Hooke's law) may be utilized, which may enable learning a larger kernel K, which may include higher order parameters (e.g., weights).

In some examples, the kernel K may instead be an elasticity (e.g., stiffness) tensor related to in-situ object strength. Elasticity (or strength) may be another example of a phase condition. According to Hooke's law, the force F that is needed to extend material by a distance x, may be represented as F=E*x, where E is the elasticity tensor, which may be represented as a kernel K (e.g., 3×3 kernel) in accordance with the techniques described herein. Similar to thermal diffusivity, the elasticity E is also related to neighboring properties and is therefore locally adaptive. In some examples, a machine learning model (e.g., neural network) may be utilized to adaptively learn the elasticity tensor E. The method 100 may be utilized to detect the material elasticity (or strength) change at different locations.

Some examples of the techniques described herein may be performed in 2D. For example, the kernel may be predicted 102 and/or a phase condition may be detected 104 in 2D (e.g., for a 2D layer or layers of material(s)). Some examples may consider the in-layer (e.g., fusing layer) x-y material phase based on 2D input data. Some examples of the techniques described herein may be performed with input data in a vertical direction (e.g., the z-direction). For example, embedded thermal sensors that collect z-direction thermal sensing may be utilized to determine an adaptive thermal diffusivity kernel and/or predict a temperature in the z direction.

In some examples, the method 100 may include performing active closed-loop control. For example, the apparatus may modify thermal applications of a subsequent layer or layers to alleviate a condition that triggers powder voxel sintering events.

In some examples, the method 100 may include performing a monitoring procedure. For instance, the apparatus may trigger a pause or stop in production in response to a frequency of sintering errors (e.g., erroneous powder voxel sintering events). In some examples, the apparatus may flag an object with the frequency of sintering errors. The flagging may indicate that post-print metrology measurement, object quality measurement, and/or control may be beneficial.

Figure 2:
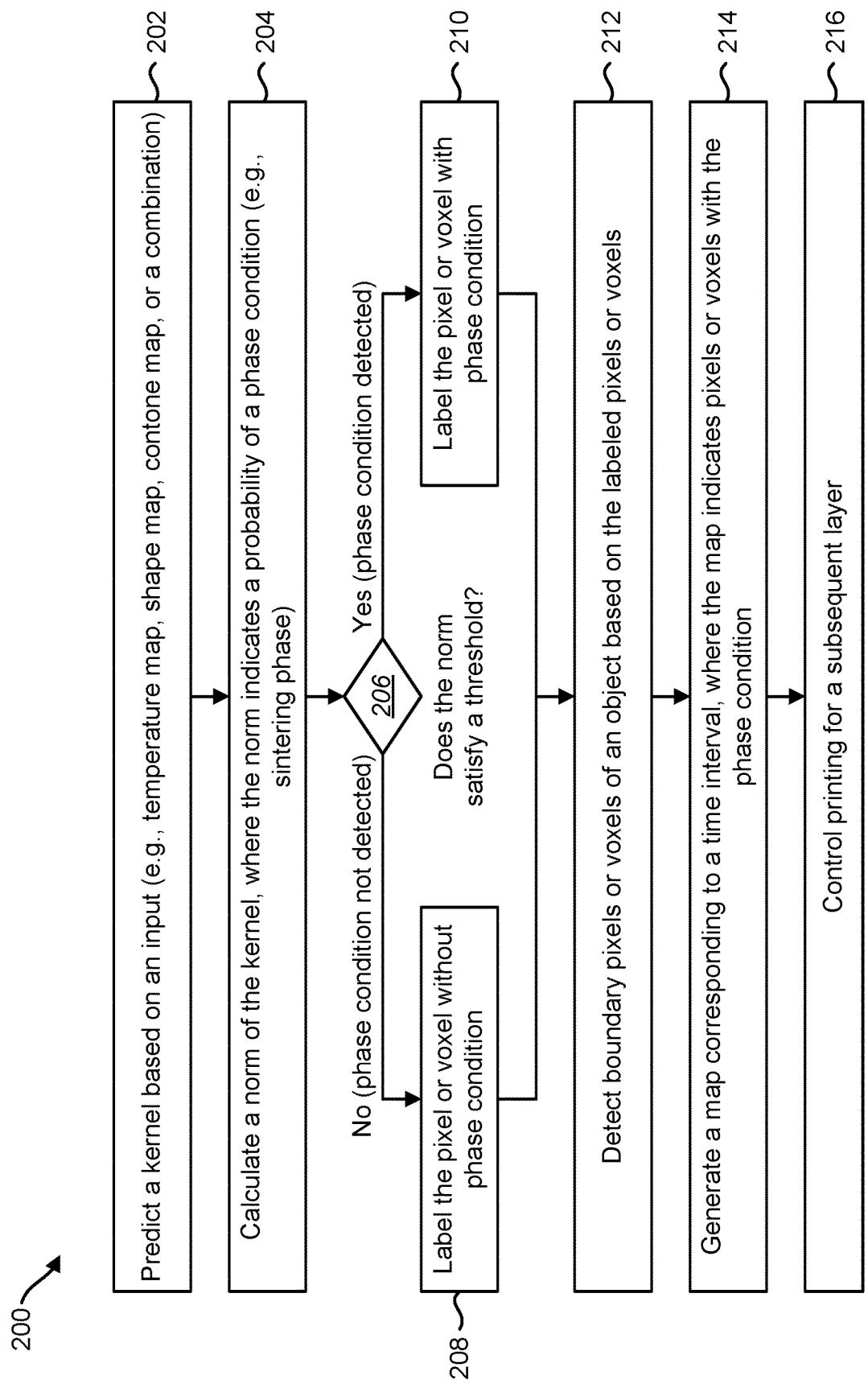
FIG. 2 is a flow diagram illustrating another example of a method for material phase detection.

FIG. 2 is a flow diagram illustrating another example of a method 200 for material phase detection. The method 200 and/or an element or elements of the method 200 may be performed by an apparatus (e.g., electronic device). For example, the method 200 may be performed by the 3D printing device 300 described in connection with FIG. 3 and/or the apparatus 432 described in connection with FIG. 4.

The apparatus may predict 202 a kernel based on an input (e.g., temperature map, shape map, contone map, portion(s) thereof, and/or combination(s) thereof). This may be accomplished as described in connection with FIG. 1.

The apparatus may calculate 204 a norm of the kernel, where the norm indicates a probability of a phase condition (e.g., sintering phase). This may be accomplished as described in connection with FIG. 1.

The apparatus may determine 206 whether the norm satisfies a threshold. This may be accomplished as described in connection with FIG. 1. For example, the apparatus may compare the norm to a threshold. If the norm is greater than the threshold, the threshold may be satisfied in some examples.

In a case that the norm satisfies the threshold, a phase condition (e.g., sintering) may be detected and the apparatus may label 210 a pixel or voxel with the phase condition (e.g., as undergoing the phase condition). In a case that the norm does not satisfy the threshold, a phase condition may not be detected and the apparatus may label 208 a pixel or voxel without the phase condition (e.g., as not undergoing the phase condition). While a particle sintering condition is utilized as an example of the techniques described herein, other phase conditions (e.g., elasticity, crystallinity, etc.) may be detected.

In some examples, the apparatus may detect 212 boundary pixels or voxels of an object based on the labeled pixels or voxels. For example, if a pixel or voxel is labeled with the phase condition next to a pixel or voxel without the phase condition, the apparatus may detect 212 the pixel or voxel as a boundary pixel or voxel. In some examples, pixels or voxels with the detected phase condition that extend the farthest from an object into a powder region may be detected 212 as boundary pixels or voxels.

In some examples, the apparatus may generate 214 a map corresponding to a time interval (e.g., dt), where the map indicates pixels or voxels with the phase condition. For example, the apparatus may generate 214 (e.g., produce visual pixel values for, render, etc.) a visual map of pixels or voxels with the phase condition (e.g., voxels in a sintering phase and undergoing phase change). In some examples, the apparatus may display the map or send it to another device (e.g., a display, a remote device, etc.) for display. In some examples, along with the printing process of each layer, the apparatus may generate a sequence of maps to indicate the pixels or voxels that are undergoing a phase condition (e.g., sintering condition) with different degrees after each time interval dt. In some examples, the apparatus may accordingly indicate which pixels or voxels, from which time intervals, encountered an approximate amount of sintering.

In some examples, the apparatus may control 216 printing for a subsequent layer. For example, the apparatus may control printing for a subsequent layer based on a phase condition of the material phase (e.g., phase change). For instance, the apparatus may control 216 agent deposition, thermal projection, and/or another thermal condition based on the detected material phase (e.g., phase condition).

Figure 3:
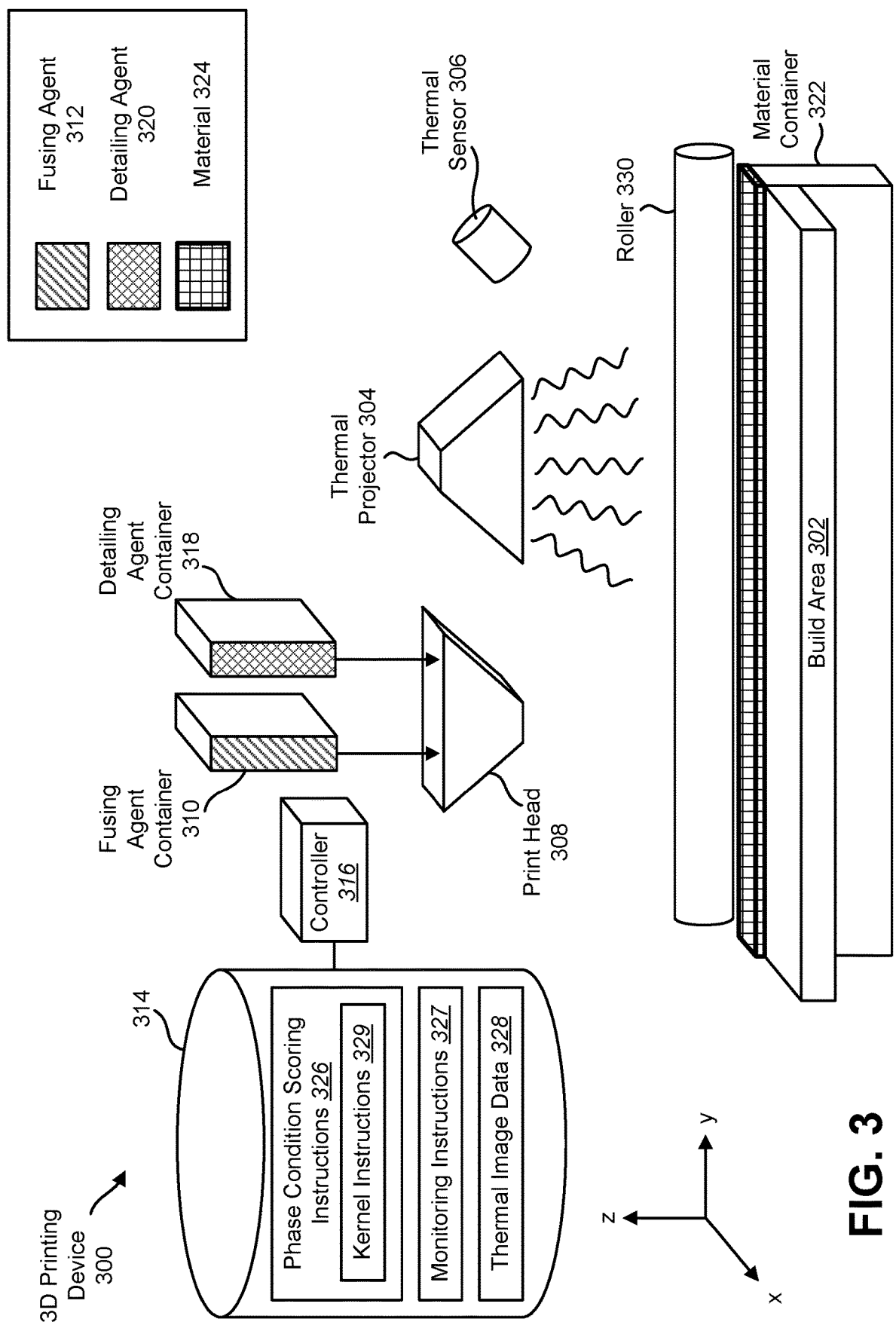
FIG. 3 is a simplified isometric view of an example of a three-dimensional (3D) printing device that may be used in an example of material phase detection.

FIG. 3 is a simplified isometric view of an example of a 3D printing device 300 that may be used in an example of material phase detection. The 3D printing device 300 may include a controller 316, a data store 314, a build area 302, a print head 308, a fusing agent container 310, a detailing agent container 318, a roller 330, a material container 322, a thermal projector 304, and/or a thermal sensor 306. The example of a 3D printing device 300 in FIG. 3 may include additional components that are not shown, and some of the components described may be removed and/or modified without departing from the scope of the 3D printing device 300 in this disclosure. The components of the 3D printing device 300 may not be drawn to scale, and thus, may have a size and/or configuration different than what is shown.

In the example of FIG. 3, the 3D printing device 300 includes a fusing agent container 310, fusing agent 312, a detailing agent container 318, detailing agent 320, a material container 322, and material 324. In other examples, the 3D printing device 300 may include more or fewer containers, agents, hoppers, and/or materials. The material container 322 is a container that stores material 324 that may be applied (e.g., spread) onto the build area 302 by the roller 330 for 3D printing. The fusing agent container 310 is a container that stores a fusing agent 312. The fusing agent 312 is a substance (e.g., liquid, powder, etc.) that controls intake thermal intensity. For example, the fusing agent 312 may be selectively applied to cause applied material 324 to change phase with heat applied from the thermal projector 304 and/or to fuse with another layer of material 324. For instance, areas of material 324 where the fusing agent 312 has been applied may eventually solidify into the object being printed. The detailing agent 320 is a substance (e.g., liquid, powder, etc.) that controls outtake thermal intensity. For example, the detailing agent 320 may be selectively applied to detail edges of the object being printed.

The build area 302 is an area (e.g., surface) on which additive manufacturing may be performed. In some configurations, the build area 302 may be the base of a "build volume," which may include a volume above the base. As used herein, the term "build area" may refer to the base of a build volume and/or another portion (e.g., another plane above the base) of the build volume.

The roller 330 is a device for applying material 324 to the build area 302. In order to print a 3D object, the roller 330 may successively apply (e.g., spread) material 324 (e.g., a powder) and the print head 308 may successively apply and/or deliver fusing agent 312 and/or detailing agent 320. The thermal projector 304 is a device that delivers energy (e.g., thermal energy, heat, etc.) to the material 324, fusing agent 312, and/or detailing agent 320 in the build area 302. For example, fusing agent 312 may be applied on a material 324 layer where particles (of the material 324) are meant to fuse together. The detailing agent 320 may be applied to modify fusing and create fine detail and/or smooth surfaces. The areas exposed to energy (e.g., thermal energy from the thermal projector 304) and reactions between the agents (e.g., fusing agent 312 and detailing agent 320) and the material 324 may cause the material 324 to selectively fuse together to form the object.

The print head 308 is a device to apply a substance or substances (e.g., fusing agent 312 and/or detailing agent 320). The print head 308 may be, for instance, a thermal inkjet print head, a piezoelectric print head, etc. The print head 308 may include a nozzle or nozzles (not shown) through which the fusing agent 312 and/or detailing agent 320 are extruded. In some examples, the print head 308 may span a dimension of the build area 302. Although a single print head 308 is depicted, multiple print heads 308 may be used that span a dimension of the build area 302. Additionally, a print head or heads 308 may be positioned in a print bar or bars. The print head 308 may be attached to a carriage (not shown in FIG. 3). The carriage may move the print head 308 over the build area 302 in a dimension or dimensions.

The material 324 is a substance (e.g., powder) for manufacturing objects. The material 324 may be moved (e.g., scooped, lifted, and/or extruded, etc.) from the material container 322, and the roller 330 may apply (e.g., spread) the material 324 onto the build area 302 (on top of a current layer, for instance). In some examples, the roller 330 may span a dimension of the build area 302 (e.g., the same dimension as the print head 308 or a different dimension than the print head 308). Although a roller 330 is depicted, other means may be utilized to apply the material 324 to the build area 302. In some examples, the roller 330 may be attached to a carriage (not shown in FIG. 3). The carriage may move the roller 330 over the build area 302 in a dimension or dimensions. In some implementations, multiple material containers 322 may be utilized. For example, two material containers 322 may be implemented on opposite sides of the build area 302, which may allow material 324 to be spread by the roller 330 in two directions.

In some examples, the thermal projector 304 may span a dimension of the build area 302. Although one thermal projector 304 is depicted, multiple thermal projectors 304 may be used that span a dimension of the build area 302. Additionally, a thermal projector or projectors 304 may be positioned in a print bar or bars. The thermal projector 304 may be attached to a carriage (not shown in FIG. 3). The carriage may move the thermal projector 304 over the build area 302 in a dimension or dimensions.

In some examples, each of the print head 308, roller 330, and thermal projector 304 may be housed separately and/or may move independently. In some examples, two or more of the print head 308, roller 330, and thermal projector 304 may be housed together and/or may move together. In one example, the print head 308 and the thermal projector 304 may be housed in a print bar spanning one dimension of the build area 302, while the roller 330 may be housed in a carriage spanning another dimension of the build area 302. For instance, the roller 330 may apply a layer of material 324 in a pass over the build area 302, which may be followed by a pass or passes of the print head 308 and thermal projector 304 over the build area 302.

The controller 316 is a computing device, a semiconductor-based microprocessor, a Central Processing Unit (CPU), Graphics Processing Unit (GPU), Field-Programmable Gate Array (FPGA), an application-specific integrated circuit (ASIC), and/or other hardware device. The controller 316 may be connected to other components of the 3D printing device 300 via communication lines (not shown).

The controller 316 may control actuators (not shown) to control operations of the components of the 3D printing device 300. For example, the controller 316 may control an actuator or actuators that control movement of the print head 308 (along the x-, y-, and/or z-axes), actuator or actuators that control movement of the roller 330 (along the x-, y-, and/or z-axes), and/or actuator or actuators that control movement of the thermal projector 304 (along the x-, y-, and/or z-axes). The controller 316 may also control the actuator or actuators that control the amounts (e.g., proportions) of fusing agent 312 and/or detailing agent 320 to be deposited by the print head 308 from the fusing agent container 310 and/or detailing agent container 318. In some examples, the controller 316 may control an actuator or actuators that raise and lower build area 302 along the z-axis.

The controller 316 may communicate with a data store 314. The data store 314 may include machine-readable instructions that cause the controller 316 to control the supply of material 324, to control the supply of fusing agent 312 and/or detailing agent 320 to the print head 308, to control movement of the print head 308, to control movement of the roller 330, and/or to control movement of the thermal projector 304.

In some examples, the controller 316 may control the roller 330, the print head 308, and/or the thermal projector 304 to print a 3D object based on a 3D model. For instance, the controller 316 may utilize a shape map (e.g., slice) that is based on the 3D model. In some examples, the controller 316 may produce and/or utilize the shape map to control the print head 308. The shape map may be utilized to determine a set of data indicating a location or locations (e.g., areas) for printing a substance (e.g., fusing agent 312 or detailing agent 320). In some examples, a shape map may include or indicate machine instructions (e.g., voxel-level machine instructions) for printing an object. For example, the shape map may be utilized to determine coordinates and/or an amount for printing the fusing agent 312 and/or coordinates and/or an amount for printing the detailing agent 320. In some examples, a shape map may correspond to a two-dimensional (2D) layer (e.g., 2D slice, 2D cross-section, etc.) of the 3D model. For instance, a 3D model may be processed to produce a plurality of shape maps corresponding to a plurality of layers of the 3D model. In some examples, a shape map may be expressed as a 2D grid of values (e.g., pixels).

The data store 314 is a machine-readable storage medium. Machine-readable storage is any electronic, magnetic, optical, or other physical storage device that stores executable instructions and/or data. A machine-readable storage medium may be, for example, Random Access Memory (RAM), an Electrically Erasable Programmable Read-Only Memory (EEPROM), a storage drive, an optical disc, and the like. A machine-readable storage medium may be encoded with executable instructions or code for controlling the 3D printing device 300. A computer-readable medium is an example of a machine-readable storage medium that is readable by a processor or computer.

The thermal sensor 306 is a device that senses or captures thermal data. The thermal sensor 306 may be integrated into, mounted in, and/or otherwise included in a machine (e.g., printer). In some examples, the thermal sensor 306 may capture thermal images of the build area 302. For instance, the thermal sensor 306 may be an infrared thermal sensor (e.g., camera) that captures thermal images of the build area (e.g., applied material in the build area 302). In some examples, the thermal sensor 306 may capture thermal images during manufacturing (e.g., printing). For example, the thermal sensor 306 may capture thermal images online and/or in real-time.

A thermal image is a set of data indicating temperature (or thermal energy) in an area. A thermal image may be captured (e.g., sensed) from a thermal sensor 306 or may be calculated (e.g., predicted). For example, the thermal sensor 306 may capture a thermal image of a layer to produce a captured thermal image.

In some examples, a captured thermal image may be a two-dimensional (2D) grid of sensed temperatures (or thermal energy). In some examples, each location in the 2D grid may correspond to a location in the build area 302 (e.g., a location (x, y) of a particular level (z) at or above the build area 302). The thermal image or images may indicate thermal variation (e.g., temperature variation) over the build area 302. In some approaches, the thermal image or images may be transformed to align with a shape map.

In some examples, the controller 316 may receive a captured thermal image of a layer from the thermal sensor 306. For example, the controller 316 may command the thermal sensor 306 to capture a thermal image and/or may receive a captured thermal image from the thermal sensor 306. In some examples, the thermal sensor 306 may capture a thermal image for each layer of an object being manufactured. Each captured thermal image may be stored as thermal image data 328 in the data store 314.

In some examples, the data store 314 may store phase condition scoring instructions 326, kernel instructions 329, monitoring instructions 327, and/or thermal image data 328. The phase condition scoring instructions 326 may include instructions to determine a phase condition score based on a kernel. In some examples, the phase condition scoring instructions 326 may include the kernel instructions 329. The kernel instructions 329 may include instructions to produce an adaptive kernel based on a portion of a thermal image at some positions. In some examples, the kernel instructions 329 may include data defining a neural network or neural networks. For instance, the kernel instructions 329 may define a node or nodes, a connection or connections between nodes, a network layer or network layers, and/or a neural network or neural networks. Examples of neural networks include convolutional neural networks (CNNs) (e.g., basic CNN, deconvolutional neural network, inception module, residual neural network, etc.). Different depths of a neural network or neural networks may be utilized.

In some examples, the controller 316 executes the kernel instructions 329 (e.g., a neural network) to convolve sub-kernels with a portion of a thermal image to produce an adaptive thermal diffusivity kernel. For example, the controller 316 may separately convolve a portion (e.g., patch) of a thermal image with each of the sub-kernels (e.g., trained sub-kernels). In some examples, the controller 316 may utilize an activation function and/or perform the convolution in accordance with Equation (5). The convolution may produce kernel parameters, which may be utilized to form the adaptive thermal diffusivity kernel. In some approaches, an adaptive thermal diffusivity kernel may be produced for a set of pixels (or voxels) or for each pixel (or voxel) in the thermal image or a temperature map corresponding to the thermal image.

In some examples, the controller 316 executes the phase condition scoring instructions 326 to determine a phase condition score based on the kernel (e.g., adaptive thermal diffusivity kernel). For example, the controller 316 may calculate a statistical metric based on the kernel to determine the phase condition score. In some examples, the controller 316 may calculate a norm (e.g., L1 norm, L2 norm, etc.) based on the kernel to determine the phase condition score. For example, the controller 316 may calculate the norm in accordance with Equation (6) or Equation (7). The norm may be the phase condition score.

It should be noted that training inputs (e.g., training thermal images, training shape maps, training contone maps, etc.) may be utilized to train the neural network or networks in some examples. For instance, the controller 316 may compute a loss function based on the training inputs. The neural network or networks may be trained based on the loss function.

In some examples, the controller 316 may execute the monitoring instructions 327 to monitor the phase condition score to detect a sintering error or sintering errors. For example, the controller 316 may compare the phase condition scores to a threshold to determine pixels or voxels that have undergone a sintering condition. The controller 316 may detect a sintering error in a case that a pixel or voxel has undergone a sintering condition beyond a threshold distance outside of an object boundary (indicated by a shape map and/or contone map, for example). The controller 316 may additionally or alternatively detect a sintering error in a case that a pixel or voxel has not undergone a sintering condition beyond a threshold distance within an object boundary (indicated by a shape map and/or contone map, for example).

In some examples, the controller 316 may flag the sintering error(s). For example, the controller 316 may produce data (e.g., a map) that marks the sintering errors. In some examples, the controller 316 may produce a message (e.g., notification, error message, etc.) in response to detecting the sintering error(s). The message may indicate the flagged sintering error(s). The message may be presented by the 3D printing device 300 and/or may be sent to another device (e.g., to a display, sent to another device via email, text message, etc.).

In some examples, the controller 316 may trigger a production stop in a case that the sintering errors satisfy a criterion. Examples of a criterion may include a sintering error severity threshold, a sintering error frequency threshold, and a combination thereof, etc. For example, in a case that a sintering error is beyond a sintering error severity threshold (e.g., a sintered pixel or voxel extends beyond a sintering error severity threshold), the controller 316 may trigger a production stop. In some examples, the controller 316 may produce a message (e.g., notification, error message, etc.) in response to the criterion being satisfied. The message may indicate that a production stop has occurred and/or reason(s) for the production stop. The message may be presented by the 3D printing device 300 and/or may be sent to another device (e.g., to a display, sent to another device via email, text message, etc.).

In some examples, the controller 316 may print a layer or layers based on the phase condition scoring. For instance, the controller 316 may control the amount and/or location of fusing agent 312 and/or detailing agent 320 for a layer based on the phase condition scoring. In some examples, the controller 316 may drive model setting (e.g., the size of the stride) based on the phase condition scoring. Additionally or alternatively, the controller 316 may perform offline print mode tuning based on the phase condition scoring. For example, if the phase condition scoring indicates systematic bias (e.g., a particular portion of the build area is consistently colder or warmer than baseline), the data pipeline may be altered such that printing is (e.g., fusing agent 312 and/or detailing agent 320 amounts and/or locations are) modified to compensate for such systematic bias. For instance, if the phase condition scoring indicates a systematic bias, the controller 316 may adjust printing (for a layer or layers, for example) to compensate for the bias. Accordingly, the location and/or amount of agent(s) deposited may be adjusted to improve print accuracy (e.g., geometric accuracy) and/or performance.

Figure 4:
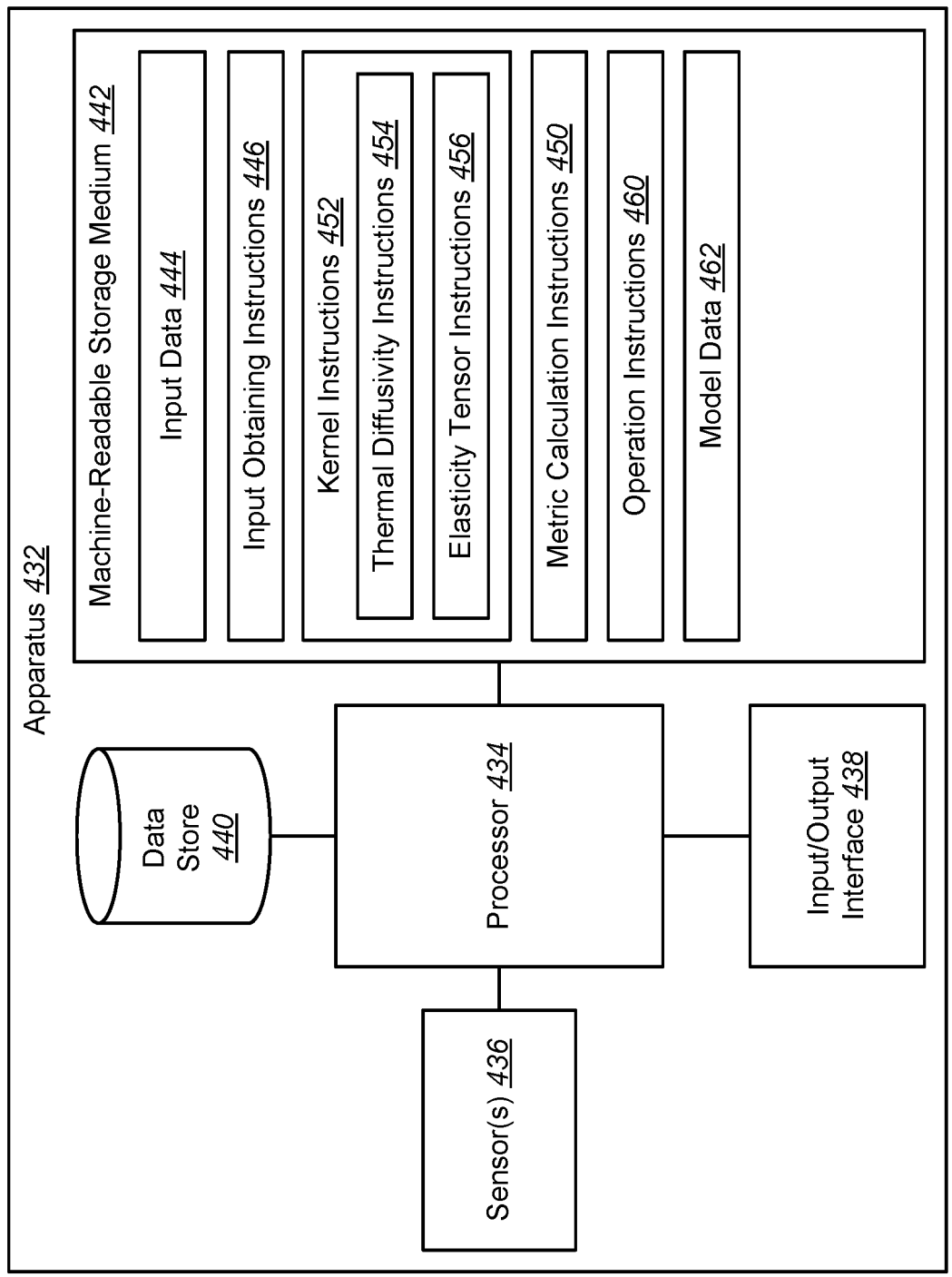
FIG. 4 is a block diagram of an example of an apparatus that may be used in material phase detection.

FIG. 4 is a block diagram of an example of an apparatus 432 that may be used in material phase detection. The apparatus 432 may be a computing device, such as a personal computer, a server computer, a printer, a 3D printer, a smartphone, a tablet computer, etc. The apparatus 432 may include and/or may be coupled to a processor 434, a data store 440, an input/output interface 438, a machine-readable storage medium 442, and/or a sensor or sensors 436. In some examples, the apparatus 432 may be in communication with (e.g., coupled to, have a communication link with) an additive manufacturing device (e.g., the 3D printing device 300 described in connection with FIG. 3). Alternatively, the apparatus 432 may be an example of the 3D printing device 300 described in connection with FIG. 1. For instance, the processor 434 may be an example of the controller 316 described in connection with FIG. 3, the data store 440 may be an example of the data store 314 described in connection with FIG. 3, and the sensor or sensors 436 may be an example of the thermal sensor 306 described in connection with FIG. 3. The apparatus 432 may include additional components (not shown) and/or some of the components described herein may be removed and/or modified without departing from the scope of this disclosure.

The processor 434 may be any of a central processing unit (CPU), a semiconductor-based microprocessor, graphics processing unit (GPU), FPGA, an application-specific integrated circuit (ASIC), and/or other hardware device suitable for retrieval and execution of instructions stored in the machine-readable storage medium 442. The processor 434 may fetch, decode, and/or execute instructions (e.g., operation instructions 460) stored on the machine-readable storage medium 442. Additionally or alternatively, the processor 434 may include an electronic circuit or circuits that include electronic components for performing a functionality or functionalities of the instructions (e.g., operation instructions 460). In some examples, the processor 434 may be configured to perform one, some, or all of the functions, operations, elements, methods, etc., described in connection with one, some, or all of FIGS. 1-6.

The machine-readable storage medium 442 may be any electronic, magnetic, optical, or other physical storage device that contains or stores electronic information (e.g., instructions and/or data). Thus, the machine-readable storage medium 442 may be, for example, Random Access Memory (RAM), Electrically Erasable Programmable Read-Only Memory (EEPROM), a storage device, an optical disc, and the like. In some implementations, the machine-readable storage medium 442 may be a non-transitory tangible machine-readable storage medium, where the term "non-transitory" does not encompass transitory propagating signals.

The apparatus 432 may also include a data store 440 on which the processor 434 may store information. The data store 440 may be volatile and/or non-volatile memory, such as Dynamic Random Access Memory (DRAM), EEPROM, magnetoresistive random-access memory (MRAM), phase change RAM (PCRAM), memristor, flash memory, and the like. In some examples, the machine-readable storage medium 442 may be included in the data store 440. Alternatively, the machine-readable storage medium 442 may be separate from the data store 440. In some approaches, the data store 440 may store similar instructions and/or data as that stored by the machine-readable storage medium 442. For example, the data store 440 may be non-volatile memory and the machine-readable storage medium 442 may be volatile memory.

The apparatus 432 may further include an input/output interface 438 through which the processor 434 may communicate with an external device or devices (not shown), for instance, to receive and store the information pertaining to the object or objects to be manufactured (e.g., printed). The input/output interface 438 may include hardware and/or machine-readable instructions to enable the processor 434 to communicate with the external device or devices. The input/output interface 438 may enable a wired or wireless connection to the external device or devices. The input/output interface 438 may further include a network interface card and/or may also include hardware and/or machine-readable instructions to enable the processor 434 to communicate with various input and/or output devices, such as a keyboard, a mouse, a display, another apparatus, electronic device, computing device, etc., through which a user may input instructions into the apparatus 432.

In some examples, the machine-readable storage medium 442 may store input data 444. The input data 444 may be obtained (e.g., received) from a sensor or sensors 436, may be received from another device, and/or may be predicted. Examples of the input data 444 include thermal images, temperature maps, shape maps, and/or contone maps. For example, the processor 434 may execute instructions to obtain a captured thermal image or images for a layer or layers. In some examples, the apparatus 432 may include a sensor or sensors 436, may be coupled to a remote sensor or sensors, and/or may receive input data 444 (e.g., a thermal image or images, temperature map(s), shape map(s), contone map(s), etc.) from a (integrated and/or remote) sensor. Some examples of the sensor(s) 436 include thermal cameras (e.g., infrared cameras) and optical cameras. Other kinds of sensors may be utilized.

In some examples, a sensor or sensors 436 may provide voxel-level (or near voxel-level) thermal sensing (e.g., 640× 480 pixels) for neural network training. For instance, the sensor or sensors 436 may capture thermal images for training temperature maps (e.g., a voxel-level ground truth for machine learning model training). In some examples for adaptive thermal diffusivity kernel prediction, the input data 444 may be collected at a rate of 10 frames per second, where printing time may be approximately 10.7 seconds per layer. The sensing rate may provide approximately 100 images per layer, which may provide thermal image segments for machine learning model training.

In some examples, the input data 444 may include and/or may be based on a thermal image or images. As described above, a thermal image may be an image that indicates heat (e.g., temperature) over an area and/or volume. For example, a thermal image may indicate a build area temperature distribution (e.g., thermal temperature distribution over a top layer). In some examples, the apparatus 432 may perform a corrective procedure on the thermal images to compensate for distortion introduced by the sensor or sensors 436. For example, a thermal image may be transformed to register the thermal image with the shape map(s) and/or contone map(s). Different types of thermal sensing devices may be used in different examples.

In some examples, the processor 434 may execute the input obtaining instructions 446 to obtain the input data 444. For example, the input obtaining instructions 446 may be executed to generate a shape map or maps (e.g., from 3D model data) and/or may receive a shape map or maps from another device (via the input/output interface 438, for example). In some examples, the input obtaining instructions 446 may be executed to generate a contone map or maps (e.g., from 3D model data and/or shape map data) and/or may receive a contone map or maps from another device (via the input/output interface 438, for example). A shape map may indicate the location of the object in a 2D layer for printing the 3D object. A contone map may indicate locations for agent distribution.

The machine-readable storage medium 442 may store kernel instructions 452. The processor 434 may execute the kernel instructions 452 to determine a kernel matrix based on an input. In some examples, the kernel instructions 452 may include data defining and/or implementing a neural network or neural networks. For instance, the kernel instructions 452 may define a node or nodes, a connection or connections between nodes, a network layer or network layers, and/or a neural network or neural networks. An example of a neural network structure that may be implemented in accordance with the techniques described herein is described in connection with FIG. 5. In some examples, the kernel instructions 452 may include and/or define thermal diffusivity instructions 454 and/or elasticity tensor instructions 456. In some examples, a neural network may be trained to produce an adaptive thermal diffusivity kernel for the thermal diffusivity instructions 454 and/or an elasticity kernel for the elasticity tensor instructions 456. For example, the thermal diffusivity instructions 454 may include a set of weights that may be trained with training temperature maps and/or training shape maps. In another example, the elasticity tensor instructions 456 may include a set of trained elasticity weights.

The processor 434 may execute the kernel instructions 452 to determine a kernel matrix based on the input. In some examples, the processor 434 may determine a kernel matrix of kernel parameters in accordance with Equation (5) and the matrix K described herein. For instance, the processor 434 may convolve the input with sub-kernels and apply an activation function to produce the kernel parameters. In some examples, the kernel matrix may be an elasticity tensor or may be based on an elasticity tensor. The processor 434 may structure the kernel parameters in accordance with the matrix K described herein.

The machine-readable storage medium 442 may store metric calculation instructions 450. The processor 434 may execute the metric calculation instructions 450 to calculate a statistic metric (e.g., norm) of parameters of the kernel matrix to determine a material phase. For example, the processor 434 may calculate a norm based on kernel parameters from the kernel matrix in accordance with Equation (6) or Equation (7). The statistic metric may indicate a probability of a phase condition. In some examples, the processor 434 may calculate an L1 norm, an L2 norm, or another statistic metric of parameters of the kernel matrix to determine a material phase.

In some examples, the processor 434 may execute the operation instructions 460 to perform an operation based on the kernel matrix and/or the material phase. For example, the processor 434 may print (e.g., control amount and/or location of agent(s) for) a layer or layers based on the predicted temperature map. In some examples, the processor 434 may drive model setting (e.g., the size of the stride) based on the kernel matrix and/or material phase. Additionally or alternatively, the processor 434 may perform offline print mode tuning based on the kernel matrix and/or material phase. In some examples, the processor 434 may perform print monitoring based on the kernel matrix and/or material phase. Additionally or alternatively, the processor 434 may send a message (e.g., alert, alarm, progress report, quality rating, etc.) based on the kernel matrix and/or material phase. Additionally or alternatively, the processor 434 may halt printing in a case that the kernel matrix and/or material phase indicates a problem (e.g., sintering errors). Additionally or alternatively, the processor 434 may feed the kernel matrix and/or material phase for the upcoming layer to a thermal feedback control system to online compensate the shape maps for the upcoming layer.

In some examples, the machine-readable storage medium 442 may store 3D model data 462. The 3D model data 462 may be generated by the apparatus 432 and/or received from another device. In some examples, the machine-readable storage medium 442 may include slicing instructions (not shown in FIG. 4). For example, the processor 434 may execute the slicing instructions to perform slicing on the 3D model data to produce a stack of shape maps (e.g., 2D vector slices).

In some examples, the operation instructions 460 may include 3D printing instructions. For instance, the processor 434 may execute the 3D printing instructions to print a 3D object or objects. In some implementations, the 3D printing instructions may include instructions for controlling a device or devices (e.g., rollers, print heads, and/or thermal projectors, etc.). For example, the 3D printing instructions may use a shape map or maps to control a print head or heads to print in a location or locations specified by the shape map or maps. In some examples, the processor 434 may execute the 3D printing instructions to print a layer or layers. The printing (e.g., thermal projector control) may be based on temperature maps (e.g., from captured thermal images and/or predicted temperature maps).

In some examples, the machine-readable storage medium 442 may store neural network training instructions. The processor 434 may execute the neural network training instructions to train a neural network or neural networks (defined by the kernel instructions 452, for instance). In some examples, the processor 434 may train the neural network or networks using a set of training data (e.g., temperature maps, training shape maps, and/or training contone maps). In some examples, the sensor(s) 436 may be utilized to obtain the training temperature maps. In some examples, the sensor(s) 436 may be placed outside of an additive manufacturing device (e.g., printer). In some approaches, the neural network training instructions may include a loss function. The processor 434 may compute the loss function based on neural network predictions and training data. For example, the training data may provide the ground truth for the loss function. The loss function may be utilized to train a neural network or neural networks. For example, a node or nodes and/or a connection weight or weights in the neural network or networks may be adjusted based on the loss function in order to improve the prediction accuracy of the neural network or networks. It should be noted that not all of the functions and/or features described in connection with FIG. 4 may be implemented or utilized in all examples.

Figure 5:
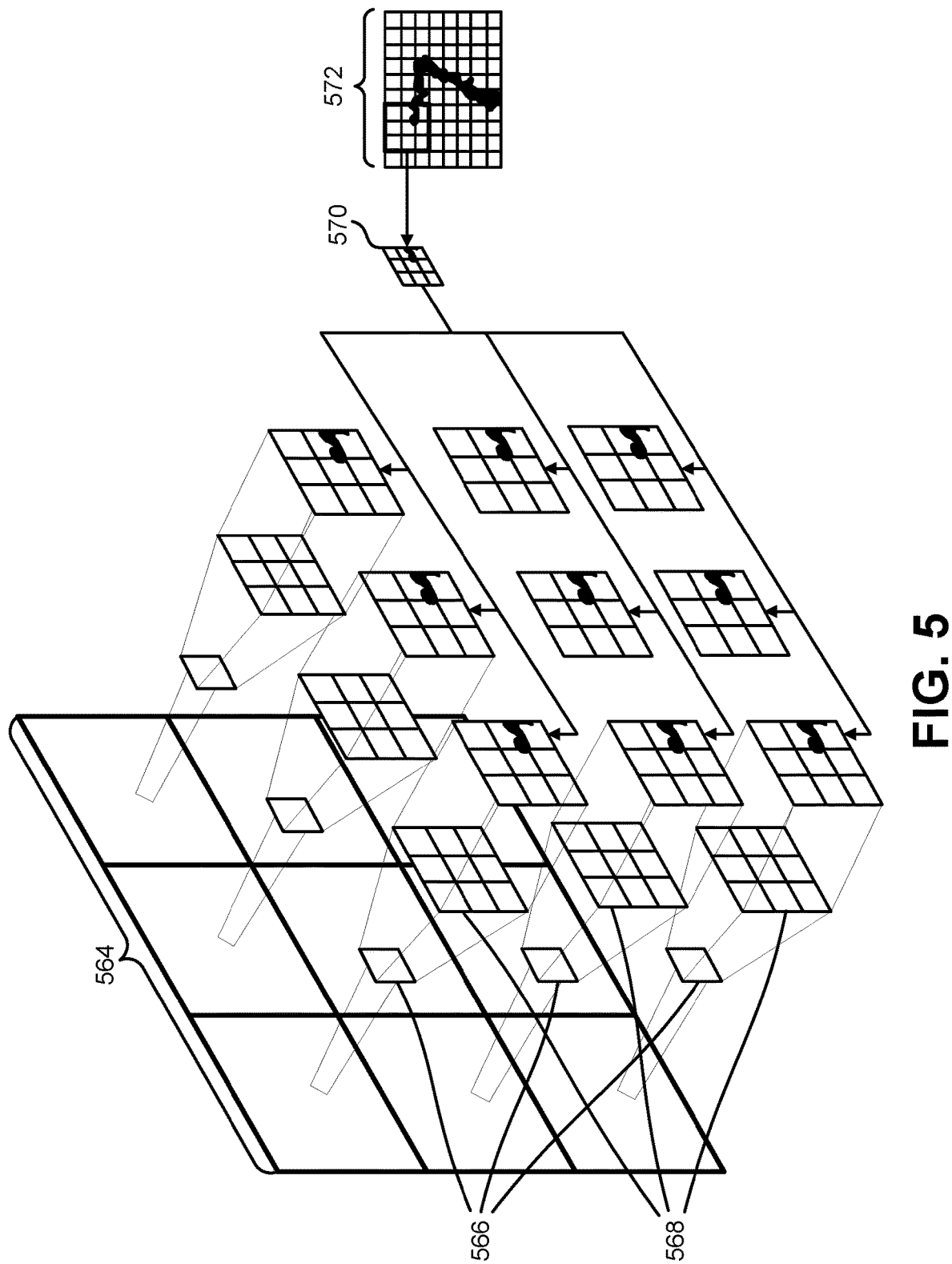
FIG. 5 is a diagram illustrating an example of a neural network structure that may be implemented in accordance with some examples of the techniques disclosed herein.

FIG. 5 is a diagram illustrating an example of a neural network structure that may be implemented in accordance with some examples of the techniques disclosed herein. For instance, the neural network structure may be utilized in accordance with some examples of the methods 100, 200, 3D printing device 300, and/or apparatus 432 described herein. FIG. 5 illustrates an input map 572. For example, the input map 572 may represent a concatenation of a temperature map and a shape map. A portion 570 (e.g., a window or sliding window) of the input map 572 may be extracted as an input. In this example, the portion 570 is a 3×3 set of pixels and may be denoted X (with $X_{i,j}$ representing a pixel of the input). The portion 570 may be convolved separately with each of a set of sub-kernels 568.

In this example, nine sub-kernels 568 may be utilized, though five sub-kernels 568 are illustrated for convenience. Each sub-kernel 568 may be denoted $Q_{u,v}$. In this example, each sub-kernel 568 is a 3×3 sub-kernel including nine weights (which may be denoted $w_{0,0}$, $w_{0,1}$, $w_{0,2}$, $w_{1,0}$, $w_{1,1}$, $w_{1,2}$, $w_{2,0}$, $w_{2,1}$, and $w_{2,2}$ for example).

The convolutions (e.g., $\sigma_{0,0}=\Sigma w_{i,j}X_{i,j}$) of the sub-kernels 568 with the portion 570 may produce kernel parameters 566. The kernel parameters 566 may be denoted $k_{0,0}$, $k_{0,1}$, $k_{0,2}$, $k_{1,2}$, $k_{2,0}$, $k_{2,1}$, and $k_{2,2}$. The kernel parameters 566 may be components of the adaptive thermal diffusivity kernel 564 (e.g., $k_{0,0}=ReLu(\sigma_{0,0})$).

In some examples, it may be observed that the adaptive thermal diffusivity kernels are different for each voxel. The kernel parameters may be different, which may indicate an anisotropic property. The kernel parameters may be small and close to zero in the center of a solid part, which is consistent with energy absorption dominating the thermal behavior in the part center, where thermal conduction may be rare. The kernel parameters may be larger but still relatively small in the powder area due to conduction. The diffusivity in a boundary area may be much larger, which may indicate that thermal diffusion mostly occurs along the boundary.

Figure 6:
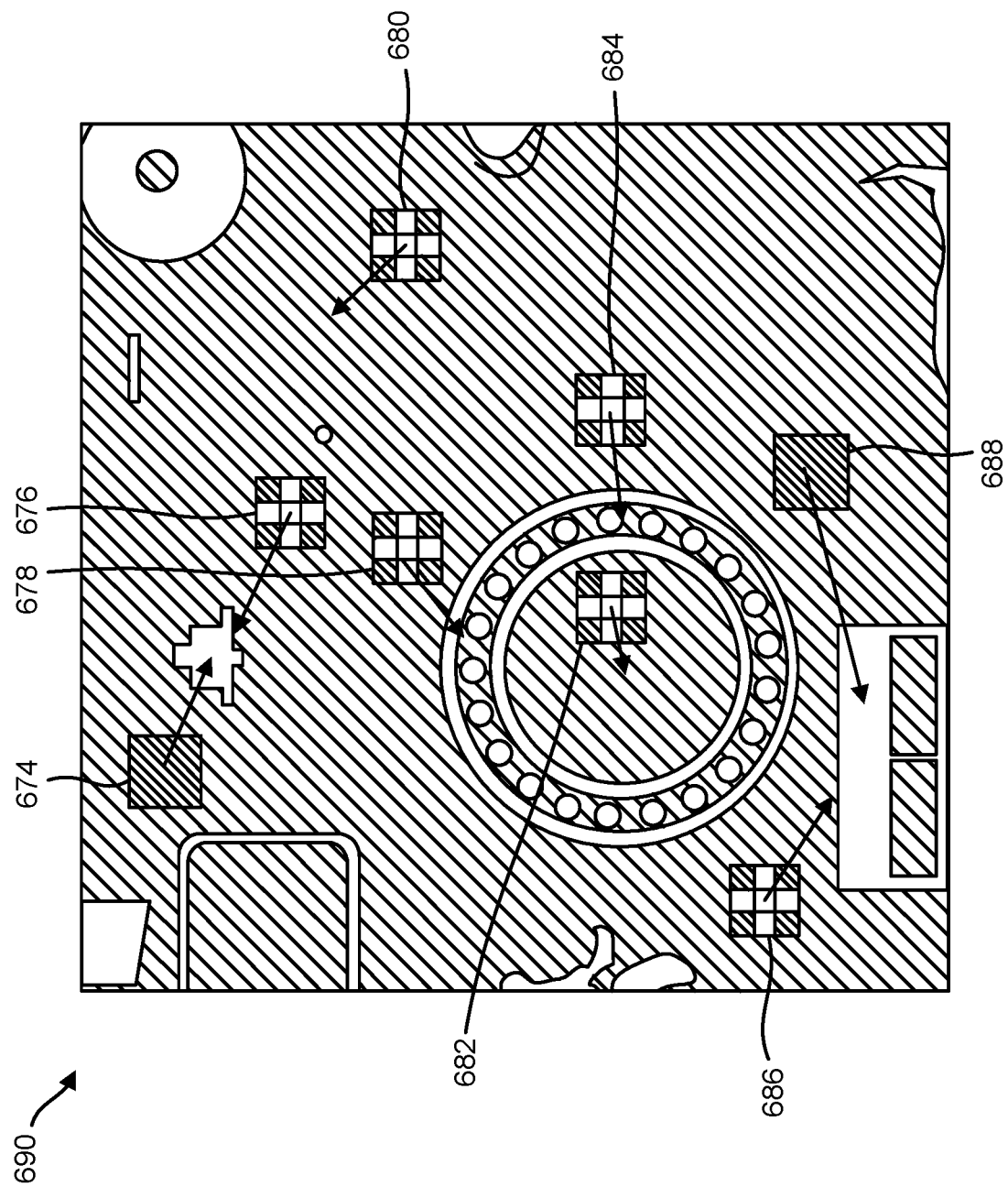
FIG. 6 is a diagram illustrating an example of adaptive thermal diffusivity kernel prediction to detect a material phase.

FIG. 6 is a diagram illustrating an example of adaptive thermal diffusivity kernel prediction to detect a material phase. Specifically, FIG. 6 illustrates a predicted temperature map 690 in conjunction with eight adaptive thermal diffusivity kernels 674, 676, 678, 680, 682, 684, 686, 688 at eight sample positions. In this example, the adaptive thermal diffusivity kernels 674, 676, 678, 680, 682, 684, 686, 688 have 3×3 dimensions. In this example, a 400×400 pixel patch in a temperature map was used, in which each pixel represents 0.5 millimeters (mm) (e.g., h=0.5) in a build area. A time interval of dt=0.3 seconds was utilized in this example.

Table 1 lists the calculated norms (e.g., sintering condition detection scores |K|) at the eight sample positions above. The eight sample positions include interior, powder, and boundary. It can be observed that |K| is larger in the boundary locations, which may indicate the voxels that undergo a sintering condition.

TABLE 1

| Kernel | Location | |K| |
|---|---|---|
| 674 | Interior | 0 |
| 676 | Boundary | 1.0385 |
| 678 | Boundary | 0.9308 |
| 680 | Powder | 0.7478 |
| 682 | Powder | 0.6236 |
| 684 | Boundary | 0.9389 |
| 686 | Boundary | 0.8118 |
| 688 | Interior | 0 |

Some examples of the techniques disclosed herein may provide in-situ particle sintering condition detection at the voxel level. Some examples of the techniques may detect a voxel in-situ particle sintering condition by detecting adaptive voxel thermal diffusivity parameters from thermal sensing. Some examples may provide an assessment of the probability of particle sintering events for powder voxels surrounding a part, which may be useful to detect geometrical accuracy of an object. Some examples may be utilized in active closed-loop control and/or passive monitoring procedures to augment control over part quality. Some examples may be applicable to a variety of additive manufacturing techniques, such as SLA, Multi-Jet Fusion, and/or Metal Jet Fusion, etc.

Some examples of the techniques described herein may be beneficial by enabling online or offline detection of an in-situ particle sintering condition at the voxel level. Some examples may be beneficial by enabling online or offline monitoring of voxel level geometrical quality along an object boundary. Some examples may be beneficial by relating the voxel in-situ particle sintering condition with local adaptive thermal diffusivity. Some examples may be beneficial by utilizing a quantitative thermal diffusivity prediction model that considers thermal diffusivity properties.

It should be noted that while various examples of systems and methods are described herein, the disclosure should not be limited to the examples. Variations of the examples described herein may be implemented within the scope of the disclosure. For example, operations, functions, aspects, or elements of the examples described herein may be omitted or combined.

The invention claimed is:

1. A method comprising:
predicting a kernel for a voxel based on an input corresponding to an object and based on a trained machine learning model of thermal diffusivity that is constrained with a physical model, wherein the kernel comprises a plurality of kernel parameters indicating thermal diffusion values for a plurality of neighboring voxels that are adjacent to the voxel;
detecting a material phase for the voxel based on the kernel predicted for the voxel; and
causing, via a processor, a modification to an amount of agent deposition for a build layer or an amount of thermal projection for the build layer based on the material phase that is detected for the voxel.

2. The method of claim 1, wherein the kernel is adaptive to neighboring voxel properties.

3. The method of claim 1, wherein detecting the material phase comprises calculating a statistic metric of the kernel predicted for the voxel.

4. The method of claim 3, wherein the statistic metric indicates a probability of the material phase being a sintering phase.

5. The method of claim 3, further comprising comparing the statistic metric to a threshold.

6. The method of claim 5, wherein the statistic metric is a norm of the kernel, wherein when the norm is greater than the threshold, a sintering phase is detected.

7. The method of claim 1, further comprising generating a map corresponding to a time interval, wherein the map indicates one or more voxels corresponding to the object that undergo a change in the material phase.

8. The method of claim 1, further comprising detecting a plurality of boundary voxels of the object based on the material phase detected.

9. The method of claim 1, further comprising controlling printing for a subsequent deposition layer of additive material based on the material phase detected.

10. The method of claim 1, wherein the input comprises a temperature map, a shape map, a contone map, a portion thereof, or a combination thereof.

11. A three-dimensional (3D) printing device, comprising:
a print head;
a thermal projector;
a thermal sensor to capture a thermal image;
a controller, wherein the controller is to:
produce a kernel for a voxel based on a portion of the thermal image and a trained machine learning model of thermal diffusivity that is constrained with a physical model, wherein the kernel comprises a plurality of kernel parameters indicating thermal diffusion values for a plurality of neighboring voxels that are adjacent to the voxel;
determine a phase condition score by detecting a material phase for the voxel based on the kernel predicted for the voxel; and
causing a modification to an amount of agent deposition for a build layer or an amount of thermal projection for the build layer based on the phase condition score determined.

12. The 3D printing device of claim 11, wherein the controller is to:
monitor the phase condition score to detect sintering errors; and
trigger a production stop when the sintering errors detected satisfy a criterion.

13. The 3D printing device of claim 11, wherein the controller is to:
monitor the phase condition score to detect sintering errors; and
flag the sintering errors when detected.

14. A non-transitory tangible computer-readable medium storing executable code, comprising:
code to cause a processor to determine a kernel matrix for a voxel based on an input corresponding to an object and based on a trained machine learning model of thermal diffusivity that is constrained with a physical model, wherein the kernel comprises a plurality kernel parameters indicating thermal diffusion values for a plurality of neighboring voxels that are adjacent to the voxel;
code to cause the processor to calculate a statistic metric of the plurality of kernel parameters of the kernel matrix to determine a material phase for the voxel; and
code to cause the processor to cause a modification to an amount of agent deposition for a build layer or thermal projection for the build layer based on the material phase that is determined for the voxel.

15. The computer-readable medium of claim 14, wherein the kernel matrix is an elasticity tensor.

* * * * *